Inventor:
Frederick J. Martin

June 22, 1926.  
F. J. MARTIN  
1,589,407  
TESTING SYSTEM FOR TESTING MULTIPLE WIRING BETWEEN SWITCHES  
Filed May 22, 1924  3 Sheets-Sheet 3
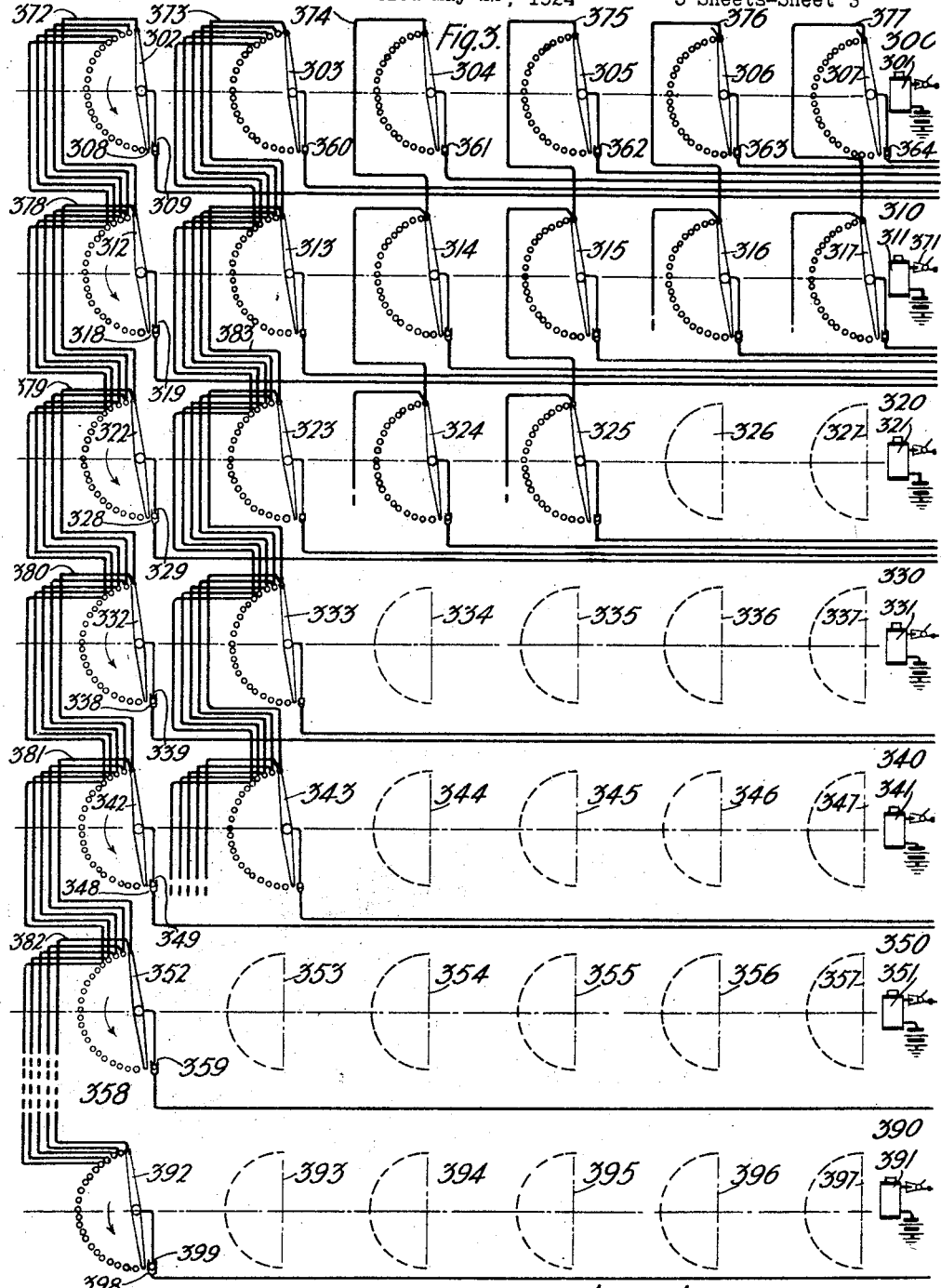
Inventor:  
Frederick J. Martin  
by E. W. Adams, Atty.

Patented June 22, 1926.

1,589,407

UNITED STATES PATENT OFFICE.

FREDERICK J. MARTIN, OF NEW YORK, N. Y., ASSIGNOR TO WESTERN ELECTRIC COMPANY, INCORPORATED, OF NEW YORK, N. Y., A CORPORATION OF NEW YORK.

TESTING SYSTEM FOR TESTING MULTIPLE WIRING BETWEEN SWITCHES.

Application filed May 22, 1924. Serial No. 715,003.

This invention relates to a telephone exchange system and more particularly to a testing system for use in machine switching systems to test multiple wiring.

It is an object of this invention to provide an improved testing system.

In machine switching offices, a large number of step-by-step switches are used to control the selection of idle senders, idle selectors, etc. These step-by-step switches are placed in groups with the bank contacts multipled from switch to switch throughout the group. Step-by-step switches of this type are wired into telephone offices in this manner in order that each may perform the function of selecting idle circuits for incoming calls that require the association of a circuit controlled through the contacts of such switches.

After the multiple wiring has been connected to step-by-step switches, it is desirable that it should be tested for wires, incorrectly soldered, opens, reverses, etc. It is also desirable under certain conditions to make such tests upon working multiple wiring. The work of testing such wiring has heretofore been done manually by the buzzer method or a similar single test method which occupies considerable time and is not always accurate.

A feature of this invention is in the provision of automatically progressive means whereby the multiple wiring between contacts of a plurality of step-by-step switches can be tested for unstandard conditions.

This and other features of the invention will be apparent from the following description taken in connection with the accompanying drawings.

While the invention has been disclosed as particularly adapted for testing apparatus of a panel type machine switching office, it is apparent from the following description that the invention has a wider utility and that by slight modifications could be adapted for testing other types of apparatus.

Referring to the drawings, Figs. 1 to 3, inclusive, when arranged in the order illustrated by the diagram in Fig. 4, disclose in detail the circuits and apparatus of the testing device embodying the principles of the present invention for making an automatic progressive test of multiple wiring.

Figs. 1 and 2 illustrate progressive testing apparatus with conductors extended to step-by-step switches shown in Fig. 3. Fig. 3 illustrates a group of step-by-step switches including the multiple wiring between contacts, such as used in a machine switching office to associate one type of circuit with an idle one of another type of circuit.

*Description of apparatus.*

The switches shown in Figs. 1 and 2 are of the step-by-step type used to progressively associate the various multipled conductors, to be tested, with the testing device. The step-by-step switches of the tesing circuit and the step-by-step switches to be tested, are of the type that advance the brush assembly upon the release of the switch magnet armature. To more fully illustrate this, it may be stated that upon the energization of the switch magnet a pawl attached to the armature of the magnet is carried forward over a tooth of a ratchet wheel and upon the release of said armature by the deenergization of the magnet, a spring attached to the armature and pawl propels the ratchet wheel and the brush assembly attached thereto, from one terminal contact to the next terminal contact. A switch of this type is illustrated in Patent No. 1,472,465, issued to O. F. Forsberg, et al. The conductors of the testing circuit that extend to the switches associated with the wiring to be tested are each equipped with a clip and the clips are arranged in the form of a jig to be fitted over terminals of the step-by-step switches that are connected to the several brushes of the switch. Other conductors extending from the testing circuit to the magnets of the step-by-step switches associated with the wiring to be tested are equipped with clips that are to be fitted over one of the magnet winding terminals.

*Detailed description of apparatus.*

Figure 1:
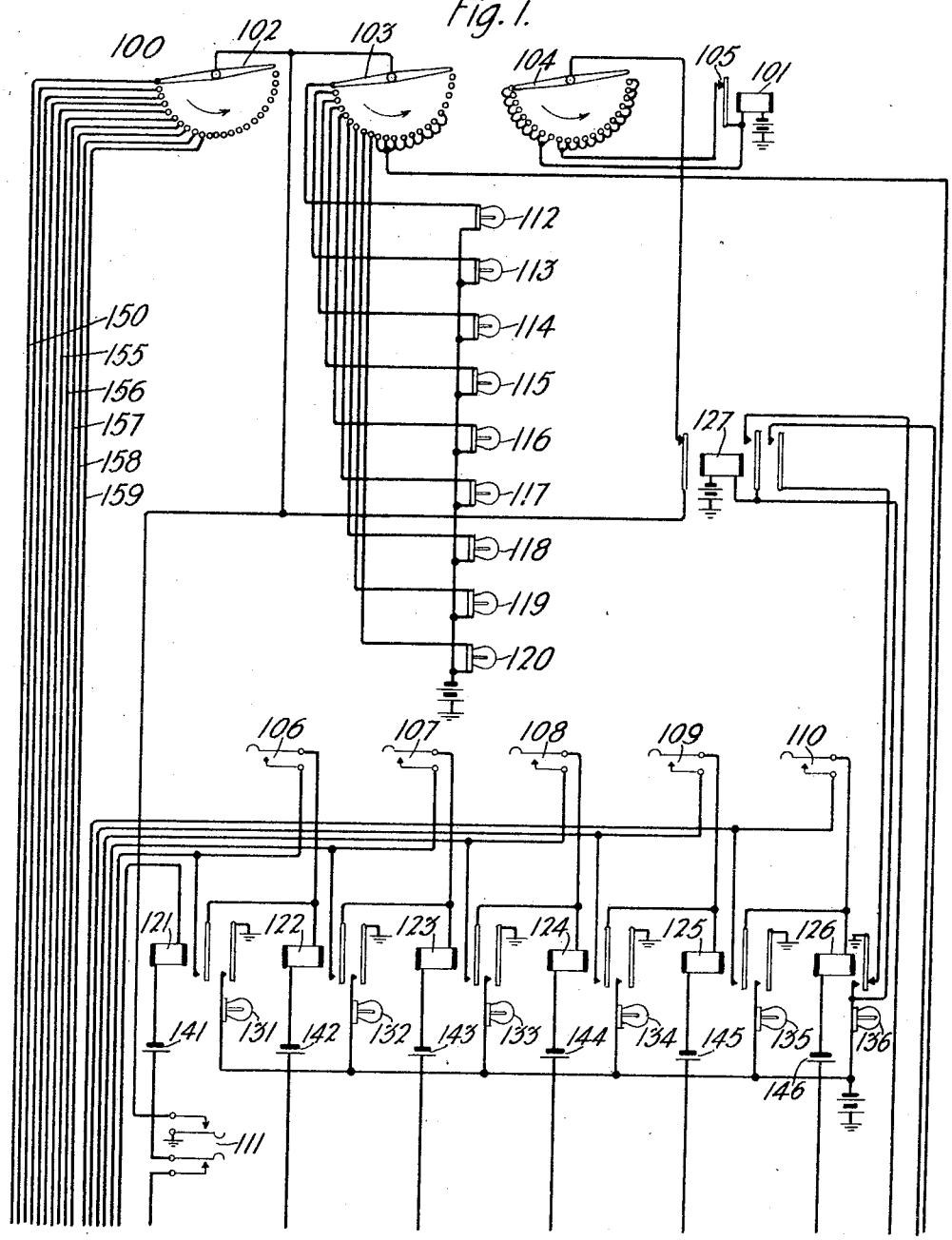
Figure 2:
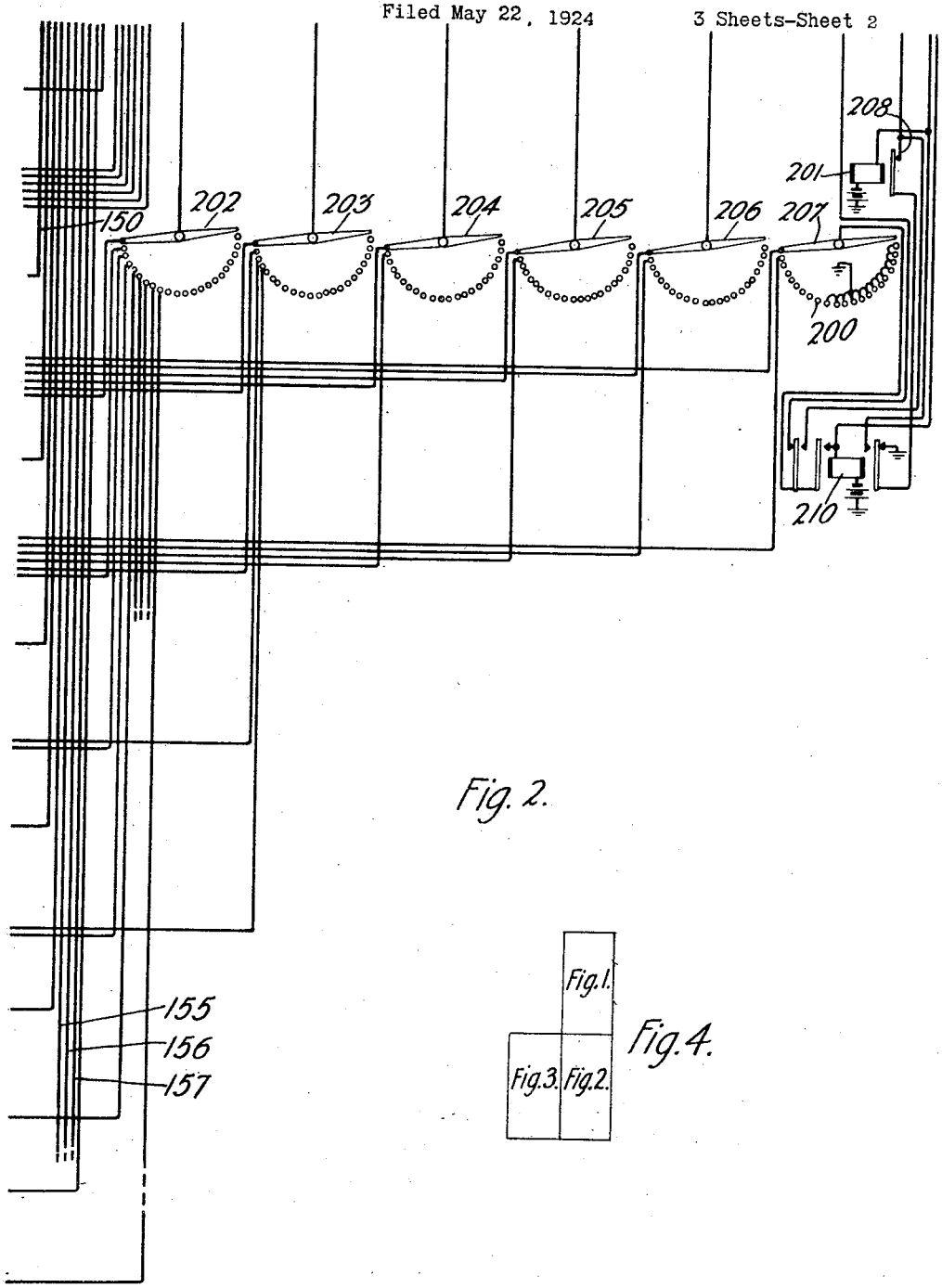

Assuming that the test man has fitted the jigs over the brush feed terminals of switches 300, 310, 320, 330, 340, 350 and 390 and also fitted the clips over the terminals of magnets 301, 311, 321, 331, 341, 351 and 391, key 111 is operated to start the testing circuit for testing the multiple wiring.

Brushes 302 to 307, inclusive, and their associated contacts, constitute switch 300 and the movement of said brushes is controlled by magnet 301. The testing device is arranged to test groups of ten of such switches. The first six and the last one of a group of ten switches are shown in Fig. 3. The seventh, eighth and ninth switch are omitted since they are the same in construction and since the associated multiple wiring is the same as shown on the other switches.

The operation of key 111 associates ground directly with brushes 102 and 103 and with brush 104 through the left contact of relay 127. A circuit is now established to actuate magnet 311 from grounded battery through its winding, clip 371, conductor 150, brush 102 and its associated contact to ground through the upper contact of key 111. Magnet 311 is actuated to attract its armature and remains actuated until the circuit traced is opened. The brush assembly is not rotated to its next position until the release of the armature associated with magnet 311. A circuit is further established to light lamp 112 from battery through the filament of lamp 112, brush 103 and its associated contact to ground through the upper contact of key 111. Lamp 112 is lighted to indicate that the multiple wiring between the first and second switch is under test. A further circuit is established to actuate switch magnet 101 from grounded battery through its winding, brush 104 and its associated contact, left contact of relay 127 to ground through the upper contact of key 111. This magnet remains energized the same as described for magnet 311 and does not rotate the brush assembly to its next position until the energizing circuit is opened to cause the release of the magnet armature.

A further circuit is established to test the multiple wiring between switches 300 and 310. The test circuit of conductor 372 may be traced from battery 141 through the winding of relay 121, clip 308, brush feed terminal 309, brush 302 and its associated contact, conductor 372, brush 312 and its associated contact, brush feed terminal 319, clip 318, brush 202 and its associated contact, lower contact of key 111 to battery 141. If conductor 372 is in a standard condition a circuit is established to operate relay 121. The operation of relay 121 establishes an obvious circuit through its right outer contact to light lamp 131 to indicate that conductor 372 is correctly associated with the switch contacts. The operation of relay 121 further establishes a circuit through its right inner contact for the test of conductor 373, extending between the first contacts of the second arcuate row of terminals of switches 300 and 310. This circuit may be traced from battery 142 through the winding of relay 122, right inner contact or relay 121, clip and brush feed terminal 360, brush 303 and its associated contact, conductor 373, brush 313 and its associated contact, and the associated clip and brush feed terminal, brush 203 and its associated contact to battery 142. If conductor 373 is properly connected to the switch terminals and in a standard condition, a circuit is established to actuate relay 122. The operation of relay 122 establishes an obvious circuit to light lamp 132 to indicate that conductor 373 is properly associated with the switch terminals. The operation of relay 122 further establishes through its right inner contact a circuit to test the multiple wiring between the first terminals of the third arcuate row of terminals of switches 300 and 310. This circuit may be traced from battery 143 through the winding of relay 123, right inner contact of relay 122, clip and brush feed terminal 361, brush 304 and its associated contact, conductor 374 brush 314 and its associated contact and associated clip and brush feed terminal, brush 204 and its associated contact to battery 143. If conductor 374 is properly connected to the terminals of switch 300 and 310 and is in a standard condition an actuating circuit is established for relay 123. The operation of relay 123 establishes an obvious circuit to light lamp 133 to indicate that conductor 374 is properly connected. The operation of relay 123 further establishes a circuit to test conductor 375 between switches 300 and 310. This circuit may be traced from battery 144 through the winding of relay 124, right inner contact of relay 123, clip and brush feed terminal 362, brush 305 and its associated contact, conductor 375, brush 315 and its associated contact and associated clip and brush feed terminal, brush 205 and its associated contact to battery 144. If conductor 375 is properly connected to the contacts of switches 300 and 310 and in a standard condition an actuating circuit is established for relay 124. The operation of relay 124 establishes an obvious circuit through its right outer contact to light lamp 134 to indicate that conductor 375 is properly associated with the contacts of switches 300 and 310. The operation of relay 124 further establishes a circuit to test conductor 376 in the manner described for conductor 375 and an energizing circuit for relay 125 is established if conductor 376 is properly associated with the contacts of switches 300 and 310. The operation of relay 125 establishes an obvious circuit through its right outer contact to light lamp 135 to indicate the success of the test and a circuit is further established by the operation of relay 125 to test conductor 377. This circuit is similar to the ones previously traced with the exception that conductor 377 is tested through brush 307 and brush 317 to actuate relay 126.

The operation of relay 126 establishes an obvious circuit to light lamp 136 and since all lamps 131 to 136, inclusive, have lighted in turn, it is apparent to the test man that unstandard conditions do not exist in the multiple wiring between the first contacts of switches 300 and 310. The operation of relay 126, further establishes a circuit to operate relay 127 to advance the testing apparatus for a second series of tests of the multiple wiring between the first terminals of switches 300 and 320. The operating circuit for relay 127 may be traced from grounded battery through its winding to ground through the contact of relay 126. Relay 127 establishes a locking circuit for itself through its right inner contact, contact of magnet 201 to ground through the right contact of relay 210. The operation of relay 127 opens the energizing circuit for magnet 101 to cause its release. The release of magnet 101 rotates brushes 102 to 104, inclusive, one position. The rotation of brush 103 extinguishes lamp 112 and establishes an obvious circuit to light lamp 113. The rotation of brush 102 opens the energizing circuit for magnet 311 to cause its release. The release of magnet 311 rotates brushes 312 to 317, inclusive, one position. The rotation of the brush assembly of switch 310 opens the circuits established to operate relays 121 to 126, inclusive, to cause their release. The release of relay 126 establishes a circuit to energize magnet 201, from grounded battery through its winding, right outer contact of relay 127 to ground through the normal contact of relay 126. The energization of magnet 201 opens the locking circuit for relay 127 to cause its release. The release of relay 127 opens the actuating circuit for magnet 201 to cause its release which action rotates brushes 202 to 207, inclusive, one position.

The testing circuit is now prepared to make the second series of tests upon the multiple wiring between the first terminals of switch 300 and 320. It will be noted that a circuit is established to energize magnet 321 from grounded battery through brush 102 and its associated contact to ground through the upper contact of key 111. Also, an energizing circuit is established for switch magnet 101 in a manner previously described. Magnets 321 and 101 remain energized until a subsequent operation of relay 127 upon the completion of the second series of tests. A test is now made of conductors 378 and 372 in series as associated with the switch contacts. It will be remembered that brush 312, along with other brushes of switch 310, has been rotated to the second position and therefore, the wiring is tested through the contact of switch 310 to ascertain whether they are properly soldered. The test of conductors 378 and 372 may be traced from battery 141 through the winding of relay 121, clip 308, brush feed terminal 309, brush 302 and its associated contact, conductor 372, conductor 378, brush 322 and its associated contact, brush feed terminal 329, clip 328, brush 202 and its associated contact, the lower contact of key 111 to battery 141. If the conductors are properly associated with the switch terminals, a circuit is established to actuate relay 121. The operation of relay 121 lights lamp 131 as previously described and a circuit is established through the right inner contact of relay 121 to establish a circuit through the winding of relay 122 to test conductors 383 and 373 in the manner described for the test of conductors 378 and 372. The test of the conductors between switches 300 and 320 proceeds in the manner described for the test of conductors between switches 300 and 310 and upon the successful completion of said test, relay 126 is operated. The operation of relay 126 again establishes a circuit to operate relay 127 to open the actuating circuit for magnet 101 which rotates its associated brush assembly one position. The advance of brush 102 opens the energizing circuit for magnet 320 to cause its release and to cause the rotation of brushes 322 to 327, inclusive, one position. Relays 121 to 126 are now released to establish an energizing circuit for switch magnet 201 and the energization of switch magnet 201 opens the energizing circuit for relay 127 which releases and in turn opens the energizing circuit for switch magnet 201. Brushes 202 to 207, inclusive, are now rotated to the third position. Upon the rotation of brush 103, lamp 113 is extinguished and a circuit established to light lamp 114 to indicate the progress of the test.

The testing device is now advanced to a position to test conductors 379, 378 and 372 in series. Magnet 331 is energized from grounded battery through its winding to ground through brush 102 and the contact of key 111, as previously described. Also switch magnet 101 is again energized. The circuit to test this multiple wiring may be traced from battery 141 through the winding of relay 121, clip 308, feed brush terminal 309, brush 302 and its associated contact, conductor 372, conductor 378, conductor 379, brush 332 and its associated contact, feed brush terminal 339, lip 338, brush 202, and its associated contact, lower contact of key 111 to battery 141. Relay 121 operates in the manner previously described to establish a circuit through the winding of relay 122 for the test of the multiple wiring between the terminal associated with brush 333 and the terminal associated with brush 303. The test now progresses in the manner previously described to test the multiple wiring between the first terminal of switch 330 and the first terminal of switch 300. The operation of the testing circuit to advance switch 100, switch 200 and switch 330 and to release relays 121 to 126, inclusive, is the same as previously described. Upon the advance of switch 100 circuits are established to energize the winding of magnet 341 and the winding of magnet 101, in the manner previously described. A test is now made of conductors 380, 379, 378 and 372 in series and if these conductors are found standard relay 121 is energized to establish a circuit for testing the conductors between brushes 343 and 303, as previously described. In this manner the conductors between the first terminal of switch 340 and switch 300 are tested.

In the maner above described, the conductors between the first terminals of the ten switches, including three not shown, are tested. During the test of the conductors between the first terminals of switch 390 and switch 300, the winding of magnet 391 is maintained energized and also the winding of magnet 101 is maintained energized. Upon the completion of test of these conductors, relay 126 is operated to establish the previously traced circuit for operating relay 127. The operation of relay 127 opens the actuating circuit for magnet 101 to cause the brush assembly to rotate one step. The rotation of brush 103 extinguishes lamp 120. The rotation of brush 102 opens the energizing circuit for magnet 391 to cause its release. The release of magnet 391 causes the brush assembly of switch 390 to rotate to its second position. The rotation of switch 390 opens the holding circuit for relays 121 to 126 to cause their release and a circuit is established from ground through the normal contact of relay 126, right outer contact of relay 127, winding of magnet 201 to grounded battery to energize magnet 201. The energization of magnet 201 opens the locking circuit for relay 127 to cause its release and the release of relay 127, in turn, opens the energizing circuit for magnet 201 to rotate the brush assembly of switch 200 one step.

Upon the release of magnet 101, a circuit is established to energize magnet 301 which may be traced from grounded battery through its winding and associated test clip, brush 102 and its associated contact to ground through the upper contact of key 111. Upon the release of relay 127, a circuit is established to rotate switch 100 to its normal first position. This circuit may be traced from grounded battery through the winding of magnet 101, contact 105, brush 104 and its associated terminals, left contact of relay 127 to ground through the upper contact of key 111. Magnet 101 is now energized and deenergized under the control of its self-interrupting contact until the brush assembly is restored to its normal position.

Upon said rotation of the switch, brush 102 disengages the terminal associated with magnet 301 to cause its release. The release of magnet 301 rotates the brush assembly of switch 300 to the second terminal. All brush assemblies of the switches associated with the wiring under test are therefore now in their second position.

During the rotation of brush 103, a circuit is established to energize relay 210 from grounded battery through its winding, brush 103 and the associated strapped contacts, to ground through the upper contact of key 111. When switch 200 rotates its brush assembly to disconnect the testing circuit from switch 390, a locking circuit is established for relay 210 from grounded battery through its left inner contact to ground through brush 207 and its associated contacts. A circuit is now established to actuate the winding of switch magnet 201 to rotate switch 200 to its normal position. This circuit may be traced from grounded battery through the winding of magnet 201, right contact of relay 210, contact of magnet 201, left outer contact of relay 210 to ground through brush 207 and its associated contacts. Switch magnet 201 now continues to operate and release under the control of relay 210 and brush 207 and its associated contacts until such time as it has rotated to its normal position. The locking circuit for relay 210 is opened when brush 207 rotates to its normal position to cause its release.

With the testing circuit again in its normal position and switches 300, 310, 320, 330, 340, 350 and 390 in position 2, the wiring associated with the terminals of said switches in position 2 is tested in the same manner as described for the wiring associated with the first terminals of the switches. The test automatically progresses until the multiple wiring associated with all terminals of the switches, Fig. 3, have been tested. The last position of the switches, Fig. 3, is not connected by multiple wiring and since in this position of the switches there will not be a continuity circuit for relays 121 to 126, inclusive, the testing circuit will be arrested in its progression and the test man will then remove the jigs and clips from the brush feed terminals and magnet windings. He will also restore key 111 to its normal position.

During the test of any particular multiple wiring, an unstandard condition prevents one of relays 121 to 126, inclusive, from operating and the automatic progression of the testing circuit is thus arrested. The location of the faulty wiring or connection is apparent to the test man from observation of the position of the switches shown in Fig. 3 and the lamps that are lighted as compared with the lamps that are not lighted in Fig. 1. The test man may note the location of the faulty wiring or connection and cause the testing circuit to proceed with the remainder of the test by the operation of one of keys 106 to 110, inclusive. For example, if lamps 131, 132 and 133 are lighted at the time that the testing circuit is arrested in its progression, the test man will operate key 109 to establish a path for the operation of relay 125, since relay 124 did not operate on account of the faulty wiring. The operation of key 109 establishes a circuit path ordinarily established through the right inner contact of relay 124.

What is claimed is:

1. An automatically progressive mechanism for detecting unstandard conditions in multiple wiring that extends from a first set of terminals through a plurality of intermediate sets of terminals to a last set of terminals comprising means to successively test said multiple wiring from said first set of terminals to each of said intermediate sets of terminals and to said last set of terminals.

2. An automatically progressive mechanism for detecting unstandard conditions in multiple wiring that extends from a first set of terminals through a plurality of intermediate sets of terminals to a last set of terminals comprising means to successively test said multiple wiring from said first set of terminals to each of said intermediate sets of terminals and from said first set of terminals to said last set of terminals through said intermediate sets of terminals.

3. An automatically progressive mechanism for detecting unstandard conditions in multiple wiring that extends from a first set of terminals through a plurality of intermediate sets of terminals to a last set of terminals comprising means to successively test said multiple wiring from said first set of terminals to each of said intermediate sets of terminals and from said first set of terminals to said last set of terminals through said intermediate sets of terminals and signaling means to indicate successful tests of said wiring.

4. An automatically progressing mechanism for detecting unstandard conditions in multiple wiring that extends from a first set of terminals through a plurality of intermediate sets of terminals to a last set of terminals comprising means to successively test said multiple wiring from said first set of terminals to each of said intermediate sets of terminals and from said first set of terminals to said last set of terminals through said intermediate sets of terminals and means to arrest the progression of said mechanism when an unstandard condition is encountered.

5. In a testing system for detecting unstandard conditions in wiring extending from a first set of terminals through intermediate set of terminals to a last set of terminals, testing apparatus, means for operating said testing apparatus to successively test each wire extending from the first set of terminals to the first intermediate set of terminals, and automatically progressive means responsive to a successful test of said wiring to position said testing apparatus for successively testing each wire extending from the first set of terminals to a second intermediate set of terminals and to continue such progressive operation to test wiring from said first set of terminals to other intermediate sets of terminals and to a last set of terminals.

6. In a testing system for detecting unstandard conditions in wiring extending from a first set of terminals through intermediate sets of terminals to a last set of terminals testing apparatus, means for operating said testing apparatus to successively test each wire extending from the first set of terminals to the first intermediate set of terminals, automatically progressive means responsive to a successful test of said wiring to position said testing apparatus for successively testing each wire extending from the first set of terminals to a second intermediate set of terminals and to continue such progressive operation to test wiring from said first set of terminals to other intermediate sets of terminals and to a last set of terminals and automatically progressive means in response to a successful test of the aforesaid wiring for successively connecting said testing apparatus to other like multiple wiring extending between other sets of terminals.

7. In a testing system for detecting unstandard conditions in wiring extending from a first set of terminals through intermediate sets of terminals to a last set of terminals, testing apparatus, means for operating said testing apparatus to successively test each wire extending from the first set of terminals to the first intermediate set of terminals, automatically progressive means responsive to a successful test of said wiring to position said testing apparatus for successively testing each wire extending from the first set of terminals to a second intermediate set of terminals and to continue such progressive operation to test wiring from said first set of terminals to other intermediate sets of terminals and to a last set of terminals, and signaling means to indicate successful tests of said wiring.

8. In a testing system for detecting unstandard conditions in wiring extending from a first set of terminals through intermediate sets of terminals to a last set of terminals, testing apparatus, means for operating said testing apparatus to successively test each wire extending from the first set of terminals to the first intermediate set of terminals, automatically progressive means responsive to a successful test of said wiring to position said testing apparatus for successively testing each wire extending from the first set of terminals to a second intermediate set of terminals and to continue such progressive operation to test wiring from said first set of terminals to other intermediate sets of terminals and a last set of terminals, and means to arrest said progressive operation when an unstandard condition is encountered.

9. A testing system for detecting unstandard conditions in multiple wiring interconnecting a plurality of sets of terminals, testing apparatus, means to operate said testing apparatus for successively testing each wire extending from a first set of terminals to a second set of terminals, and automatically progressive means responsive to a successful test of said wiring to position said testing apparatus for successively testing each wire extending from the first set of terminals to a third set of terminals.

10. In a testing system for detecting unstandard conditions in multiple wiring interconnecting sets of contacts of a plurality of switches, said switches having movable brush members, testing apparatus, means to operate said testing apparatus to successively test each wire extending from a first set of contacts to each like set of contacts of said plurality of switches, and means to move said brush members to associate the testing apparatus with other sets of contacts of said switches.

In witness whereof, I hereunto subscribe my name this 19th day of May, A. D., 1924.

FREDERICK J. MARTIN.